Patented July 24, 1951

2,561,324

UNITED STATES PATENT OFFICE 2,561,324

1,3,7,9-TETRAMETHYL-2,4,6,8-TETRAOXODI-PYRIMIDO [4.5-b,5'.4'-e] PYRAZINE

Oliver De Garmo, St. Louis, Mo., assignor to Monsanto Chemical Company, St. Louis, Mo., a corporation of Delaware No Drawing. Application May 8, 1950,
Serial No. 160,820

3 Claims. (Cl. 260—251.5)

This invention relates to 1,3,7,9-tetramethyl-2,4,6,8-tetraoxodipyrimido[4.5-b,5'.4'-e] pyrazine as a new chemical compound having utility per se as a pharmaceutical and as an intermediate in the preparation of other organic compounds having utility as therapeutic agents. The novel compound of this invention may be structurally represented as follows:

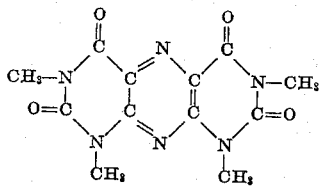

The novel compound of this invention may be conveniently prepared by reacting 1,3-dimethyl-4,5-diamino uracil with dimethyl alloxan. Preferably, the reaction is carried out by reacting approximately equimolecular proportions of the aforementioned reactants in an aqueous alkaline medium, such as a water solution of an alkali metal hydroxide or carbonate, at a temperature in the range of from about 0° C. to about 100° C. The following example is illustrative of a method of preparing the novel compound of this invention:

9.4 parts by weight of dimethyl alloxan and 8.5 parts by weight of 1,3-dimethyl-4,5-diamino uracil were added to 500 parts by weight of water. The mixture was heated to a temperature in the range of about 60°–100° C. and maintained at a temperature in that range for a period of about five hours with continuous stirring. 100 parts by weight of N/2 NaOH were then added and, after an additional two hour heating period, the precipitate of 1,3,7,9-tetramethyl-2,4,6,8-tetraoxodipyrimido[4.5-b,5'.4'-e]pyrazine, which had formed in the reaction mixture, filtered from the hot 60°–100° C.) reaction mixture. The precipitate was washed with cold water and dried at a temperature of about 110° C. The dried material was recrystallized from ethyl alcohol.

The substantially pure 1,3,7,9-tetramethyl-2,4,6,8-tetraoxodipyrimido[4.5-b,5'.4'-e] pyrazine thus obtained was a light yellow crystalline solid having a melting point of 206.0°–207.0° C.

What is claimed is:

1. 1,3,7,9-tetramethyl-2,4,6,8-tetraoxodipyrimido[4.5-b,5'.4'-e]pyrazine.

2. The process of preparing 1,3,7,9-tetramethyl-2,4,6,8-tetraoxodipyrimido[4.5-b,5'.4'-e]pyrazine, which comprises reacting 1,3-dimethyl-4,5-diamino uracil with dimethyl alloxan.

3. The process of preparing 1,3,7,9-tetramethyl-2,4,6,8-tetraoxodipyrimido[4.5-b,5'.4'-e]pyrazine, which comprises reacting approximately equimolecular proportions of 1,3-dimethyl-4,5-diamino uracil and dimethyl alloxan in an aqueous alkaline medium.

OLIVER DE GARMO.

No references cited.